(12) United States Patent
Kurokawa

(10) Patent No.: US 8,622,863 B2
(45) Date of Patent: Jan. 7, 2014

(54) DRIVING APPARATUS FOR HYBRID VEHICLE

(75) Inventor: Takuya Kurokawa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 287 days.

(21) Appl. No.: 13/154,762

(22) Filed: Jun. 7, 2011

(65) Prior Publication Data

US 2011/0300983 A1 Dec. 8, 2011

(30) Foreign Application Priority Data

Jun. 7, 2010 (JP) ................................. 2010-130201
Mar. 25, 2011 (JP) ................................. 2011-067095

(51) Int. Cl.
*B60K 6/365* (2007.10)
*B60K 6/40* (2007.10)
*B60K 6/50* (2007.10)

(52) U.S. Cl.
USPC ................. 475/5; 475/10; 475/302; 475/325; 903/911

(58) Field of Classification Search
USPC ......... 475/5, 10, 296, 302, 323, 325; 903/911
See application file for complete search history.

(56) References Cited

FOREIGN PATENT DOCUMENTS

JP           3099721 B2     10/2000

*Primary Examiner* — Justin Holmes
*Assistant Examiner* — Jacob S Scott
(74) *Attorney, Agent, or Firm* — Westerman, Hattori, Daniels & Adrian, LLP

(57) ABSTRACT

In a hybrid vehicle driving apparatus having an input shaft connected to an engine, an output shaft connected to wheels, a first planetary gear mechanism whose sun gear is connected to the input shaft, a second planetary gear mechanism whose carrier is connected to the input shaft, a mechanism reducing rotation speed of the input shaft and transmit to the first planetary gear mechanism carrier, a clutch connecting/disconnecting the first planetary gear mechanism carrier and the second planetary gear mechanism sun gear, and a clutch connecting/disconnecting ring gears of the first and second planetary gear mechanisms, the second planetary gear mechanism ring gear is connected to the output shaft and an electric rotating machine is connected to the first planetary gear mechanism carrier, thereby enabling a vehicle to run only with the engine, while improving the operation efficiency on the high ratio side.

10 Claims, 18 Drawing Sheets

FIG.3

|              | C1 | C2 | C3 | C4 |
|---|---|---|---|---|
| 5 (EV POSSIBLE) | O |   |   | O |
| 4 (EV POSSIBLE) |   | O |   | O |
| 3 (EV POSSIBLE) |   |   | O | O |
| 2 (EV POSSIBLE) |   | O | O |   |
| 1 (EV POSSIBLE) | O |   | O |   |
| R-EV            | O |   | O |   |

FIG.6

|  | B1 | C1 | C2 | C3 | C4 |
|---|---|---|---|---|---|
| 7 | ○ |  |  |  | ○ |
| 6 (EV POSSIBLE) |  | ○ |  |  | ○ |
| 5 (EV POSSIBLE) |  |  | ○ |  | ○ |
| 4 (EV POSSIBLE) |  |  |  | ○ | ○ |
| 3 (EV POSSIBLE) |  |  | ○ | ○ |  |
| 2 (EV POSSIBLE) |  | ○ |  | ○ |  |
| 1 | ○ |  |  | ○ |  |
| ELECTRIC CVT |  |  |  |  | ○ |
| EV |  |  |  |  | (○) |
| SERIES EV |  | ○ | (○) |  |  |
| R-EV |  | ○ |  | ○ |  |

FIG.16

|   | B1 | C1 | C2 | C3 | C4 | C5 |
|---|----|----|----|----|----|----|
| 7 | O  |    |    |    | O  | O  |
| 6 |    | O  |    |    | O  | O  |
| 5 |    |    | O  |    | O  | O  |
| 4 |    |    |    | O  | O  | O  |
| 3 |    |    | O  | O  |    | O  |
| 2 |    | O  |    | O  |    | O  |
| 1 | O  |    |    | O  |    | O  |
| ELECTRIC CVT |  |  |  |  | O | O |
| EV |  |  |  | (O) | (O) |  |
| TWO-MOTOR EV |  |  |  | O | O |  |
| SERIES EV |  | O | (O) |  |  | O |
| R-EV |  |  |  |  | (O) |  |

*FIG.18*

|     | B1 | C1 | C2 | C3 | C4 | C5 |
|-----|----|----|----|----|----|----|
| 6EV |    | ○  |    |    | ○  |    |
| 5EV |    |    | ○  |    | ○  |    |
| 4EV |    |    |    | ○  | ○  |    |
| 3EV |    |    | ○  | ○  |    |    |
| 2EV |    | ○  |    | ○  |    |    |

DRIVING APPARATUS FOR HYBRID VEHICLE

CROSS-REFERENCE TO RELATED APPLICATIONS

This application claims priority to Japanese Patent Applications No. 2010-130201 filed on Jun. 7, 2010 and No. 2011-067095 filed on Mar. 25, 2011, which are incorporated by reference herein in their entirety.

BACKGROUND OF THE INVENTION

1. Technical Field

This invention relates to a driving apparatus for a hybrid vehicle.

2. Background Art

A driving apparatus for a hybrid vehicle proposed by Japanese Patent No. 3099721 is known. The technique of the reference is configured to have an internal combusting engine and first and second electric rotating machines, and the first rotating machine or the first rotating machine and engine is/are used as a prime mover(s) of the vehicle, while the second rotating machine is driven by the engine to generate electric power.

SUMMARY OF INVENTION

In the above technique, when the vehicle runs, the second rotating machine needs to be operated as a generator while the first rotating machine needs to be operated as an electric motor all the time, so that this configuration that the energy always passes through the electrical system degrades the efficiency. Further, since the driving efficiency thereof lowers as the second rotating machine is operated at relatively low rotational speed, the operation efficiency on the high ratio side lowers accordingly.

An object of this invention is therefore to overcome the foregoing drawback by providing a driving apparatus for a hybrid vehicle having an internal combustion engine and at least one electric rotating machine, which apparatus can make a vehicle run only with the engine, while improving the operation efficiency on the high ratio side.

In order to achieve the object, this invention provides an apparatus for driving a hybrid vehicle having an internal combustion engine (Eg), an electric rotating machine (G) and wheels, comprising: an input shaft (16) connected to the engine; an output shaft (22) connected to the wheels; a first planetary gear mechanism (24) of a double pinion type whose sun gear (Sf) is connected to the input shaft; a second planetary gear mechanism (26) of a single pinion type whose carrier (Cr) is connected to the input shaft; a speed-reduction mechanism (Gr) adapted to reduce rotation of the input shaft in speed and transmit it to a carrier (Cf) of the first planetary gear mechanism; a clutch (C4) adapted to connect/disconnect the carrier (Cf) of the first planetary gear mechanism and a sun gear (Sr) of the second planetary gear mechanism; and a clutch (C3) adapted to connect/disconnect a ring gear (Rf) of the first planetary gear mechanism and a ring gear (Rr) of the second planetary gear mechanism; wherein the ring gear (Rr) of the second planetary gear mechanism is connected to the output shaft and the electric rotating machine is connected to the carrier (Cf) of the first planetary gear mechanism.

BRIEF DESCRIPTION OF DRAWINGS

The above and other objects and advantages of the invention will be more apparent from the following description and drawings in which:

FIG. 3 is a table showing engagement of clutches used for establishing gear positions in the apparatus shown in FIG. 1;

FIG. 6 is a table showing engagement of clutches used for establishing gear positions in the apparatus shown in FIG. 4;

FIG. 16 is a table showing engagement of clutches used for establishing gear positions in the apparatus shown in FIG. 15;

FIG. 18 is a table showing engagement of the clutches used for establishing gear positions during the operation shown in FIG. 17.

DESCRIPTION OF EMBODIMENTS

Embodiments of a driving apparatus for a hybrid vehicle according to the invention will now be explained with reference to the attached drawings.

Figure 1:
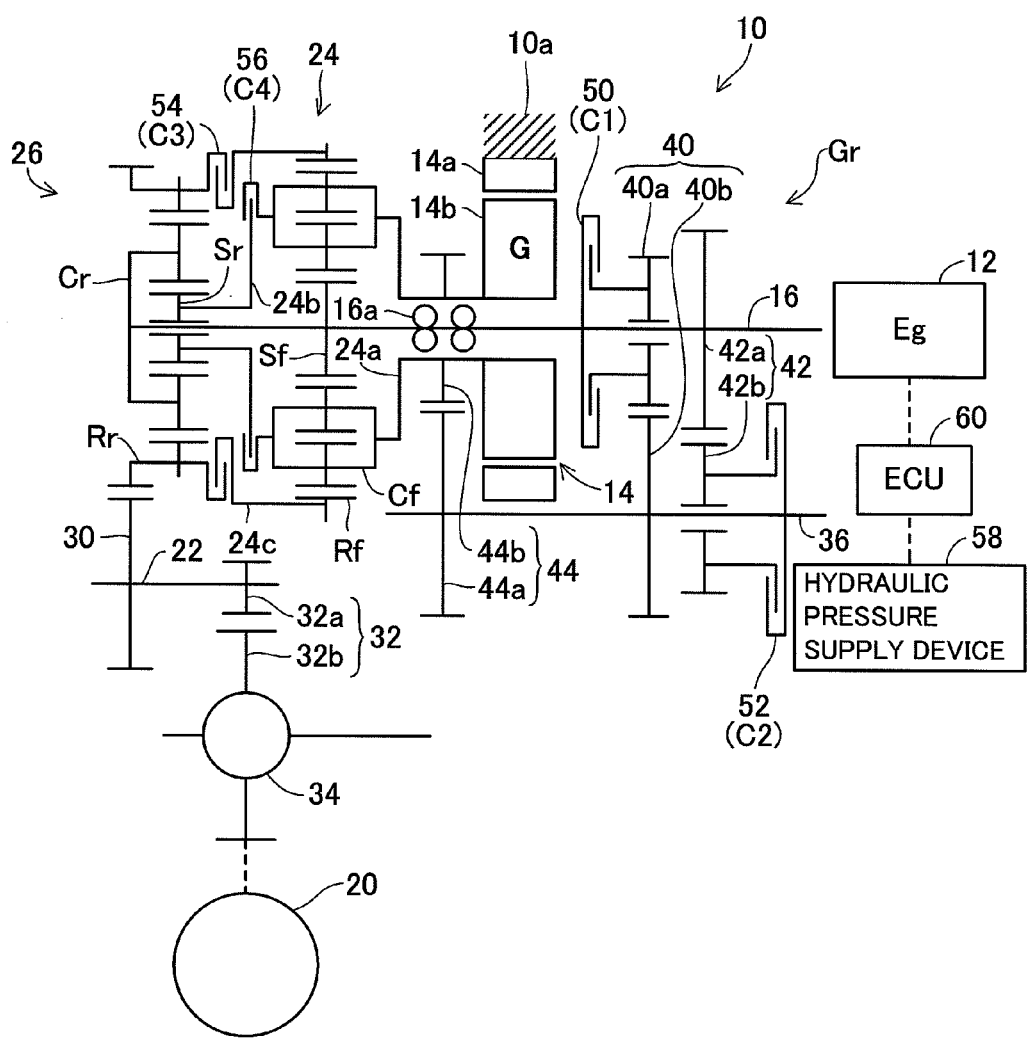
FIG. 1 is an overall view schematically showing a driving apparatus for a hybrid vehicle according to a first embodiment of the invention.

FIG. 1 is an overall view schematically showing a driving apparatus for a hybrid vehicle according to a first embodiment of the invention;

In FIG. 1, symbol 10 indicates the driving apparatus for the hybrid vehicle. The apparatus 10 comprises an internal combustion engine 12, at least one electric rotating machine 14, an input shaft 16 connected to the engine 12, an output shaft 22 connected to a driven wheel 20, and a first planetary gear mechanism 24 and second planetary gear mechanism 26 that are installed between the input shaft 16 and the output shaft 22. The first planetary gear mechanism 24 is positioned on the upstream (front) side in the input from the engine 12, and the second planetary gear mechanism 26 on the downstream (rear) side. The apparatus 10 is mounted on the hybrid vehicle (not shown).

The engine (indicated by "Eg" in FIG. 1) 12 comprises a spark-ignition, gasoline engine (or a compression-ignition, diesel engine that runs on light oil), in which the air-fuel mixture is ignited and burned to drive a piston (not shown).

The motion of the driven piston is transmitted to the crankshaft (not shown) to rotate and the drive force of the engine 12 (to be outputted from its output shaft connected to the crankshaft) is inputted to the input shaft 16 through a damper such as a flywheel, torque converter, etc.

The rotating machine (indicated by "G") 14 comprises a brushless AC synchronous motor. The rotating machine 14 is a motor when supplied with current and is a generator when rotated by the engine 12 (or the wheel 20). Hereinafter the rotating machine 14 is called the "motor/generator."

Thus, in the embodiments, the term of the "rotating machine" means a device that functions as the motor and generator. Electric energy generated by the motor/generator 14 is stored in an energy storage (not shown) such as a battery and supplied to the motor/generator 14 when it is operated as the motor.

The motor/generator 14 is equipped with a stator 14a fixed to an apparatus housing 10a and a rotor 14b installed to be rotatable relative to the stator 14a. In the apparatus 10, the input shaft 16 is rotatably supported by the housing 10a through a bearing 16a.

The first planetary gear mechanism 24 includes a sun gear Sf, carrier Cf and ring gear Rf and is of a double pinion type in which the carrier Cf is connected to two pinions as a unit.

The second planetary gear mechanism 26 includes a sun gear Sr, carrier Cr and ring rear Rr and is of a single pinion type in which the carrier Cr is connected to one pinion as a unit.

In the first planetary gear mechanism 24, the sun gear Sf is connected to the input shaft 16 to be driven by the engine 12. The carrier Cf is connected at its upstream side to the rotor 14b of the motor/generator 14 through a connection member 24a and at its downstream side to the sun gear Sr of the second planetary gear mechanism (Pr) 26 through a connection member 24b. The ring gear Rf is connected to the ring gear Rr of the second planetary gear mechanism (Pr) 26 through a connection member 24c.

In the second planetary gear mechanism 26, the carrier Cr is connected to the input shaft 16 to be driven by the engine 12. One end of the ring gear Rr is connected to the ring gear Rf of the first planetary gear mechanism (Pf) 24 as mentioned above, while the other end thereof is meshed with a reduction gear 30 fastened to the output shaft 22.

The output shaft 22 is fastened with a drive gear 32a in the vicinity of the reduction gear 30. The rotation of the reduction gear 30 is transmitted to the driven wheel 20 through the drive gear 32a and a driven gear 32b to be meshed therewith and installed in a differential 34.

The apparatus 10 is equipped with an intermediate shaft 36 positioned in parallel with the input shaft 16. The input shaft 16 is installed with a drive gear 40a to be relatively rotatable at the upstream side of the first planetary gear mechanism 24. The intermediate shaft 36 is fastened with a driven gear 40b to be meshed with the drive gear 40a and having more teeth than the drive gear 40a.

The input shaft 16 is fastened at its upstream side with a drive gear 42a and a driven gear 42b to be meshed with the drive gear 42a is installed on the intermediate shaft 36 to be relatively rotatable.

Further, the intermediate shaft 36 is fastened at its downstream side with a drive gear 44a and a driven gear 44b to be meshed with the drive gear 44a is fastened to the connection member 24a of the first planetary gear mechanism 24, whereby the rotation of the intermediate shaft 36 is transmitted to the rotor 14b of the motor/generator (G) 14.

The drive gear 40a is disposed with a first clutch (C1) 50, while the driven gear 42b is disposed with a second clutch (C2) 52. The first and second clutches (C1, C2) 50, 52 comprise hydraulic clutches of multiple plate type and connect (engage)/disconnect (disengage) the input shaft 16 and the intermediate shaft 36.

Specifically, when the hydraulic pressure (hydraulic pressure of Automatic Transmission Fluid) is supplied in accordance with the running condition of the vehicle, the clutches (C1, C2) 50, 52 are engaged (made ON) to connect (transmit the rotation of) the input shaft 16 to the intermediate shaft 36 through the gears 40, 42 and when the hydraulic pressure is discharged, they are released (made OFF) to disconnect (the rotation of) the input shaft 16 from the intermediate shaft 36 through the gears 40, 42.

Owing to the above configuration, the gears 40, 42, 44 and clutches (C1, C2) 50, 52 function as a speed-reduction mechanism Gr that can reduce the rotation of the input shaft 16 in speed and transmit it to the carrier (Cf) of the first planetary gear mechanism 24. Thus the speed-reduction mechanism Gr comprises the clutches (first and second clutches (C1, C2) 50, 52) that are capable of making/cutting off the connection between the input shaft 16 and the carrier Cf of the first planetary gear mechanism 24.

The connection member 24c of the second planetary gear mechanism 26 is installed with a third clutch (C3) 54 and the connection member 24b of the first planetary gear mechanism 24 is installed with a fourth clutch (C4) 56. The clutches (C3, C4) 54, 56 also comprise hydraulic clutches of multiple plate type and make/cut off the connection between the ring gears 54, 56 of the planetary gear mechanisms 24, 26 and that between the carrier Cf of the first planetary gear mechanism 24 and the sun gear Sr of the second planetary gear mechanism 26.

Specifically, when the hydraulic pressure is supplied, the third clutch (C3) 54 is engaged (made ON) to connect the ring gear Rf of the first planetary gear mechanism 24 with the ring gear Rr of the second planetary gear mechanism 26, and when the hydraulic pressure is discharged, it is disengaged (made OFF) to disconnect the ring gear Rf from the ring gear Rr.

Further, when the hydraulic pressure is supplied, the fourth clutch (C4) 56 is engaged (made ON) to connect the carrier Cf of the first planetary gear mechanism 24 with the sun gear Sr of the second planetary gear mechanism 26, and when the hydraulic pressure is discharged, it is disengaged (made OFF) to disconnect the carrier Cf form the sun gear Sr.

The apparatus 10 comprises a hydraulic pressure supply device 58 adapted to supply hydraulic pressure to the first to fourth clutches Cn (C1, C2, C3, C4) 50, 52, 54, 56 to engage (connect) the associated parts and an Electronic Control Unit (ECU; controller) 60. The ECU 60 comprises a microcomputer and controls the operation of the engine 12, motor/generator 14 and hydraulic pressure supply device 58 in accordance with the vehicle running condition.

Figure 2:
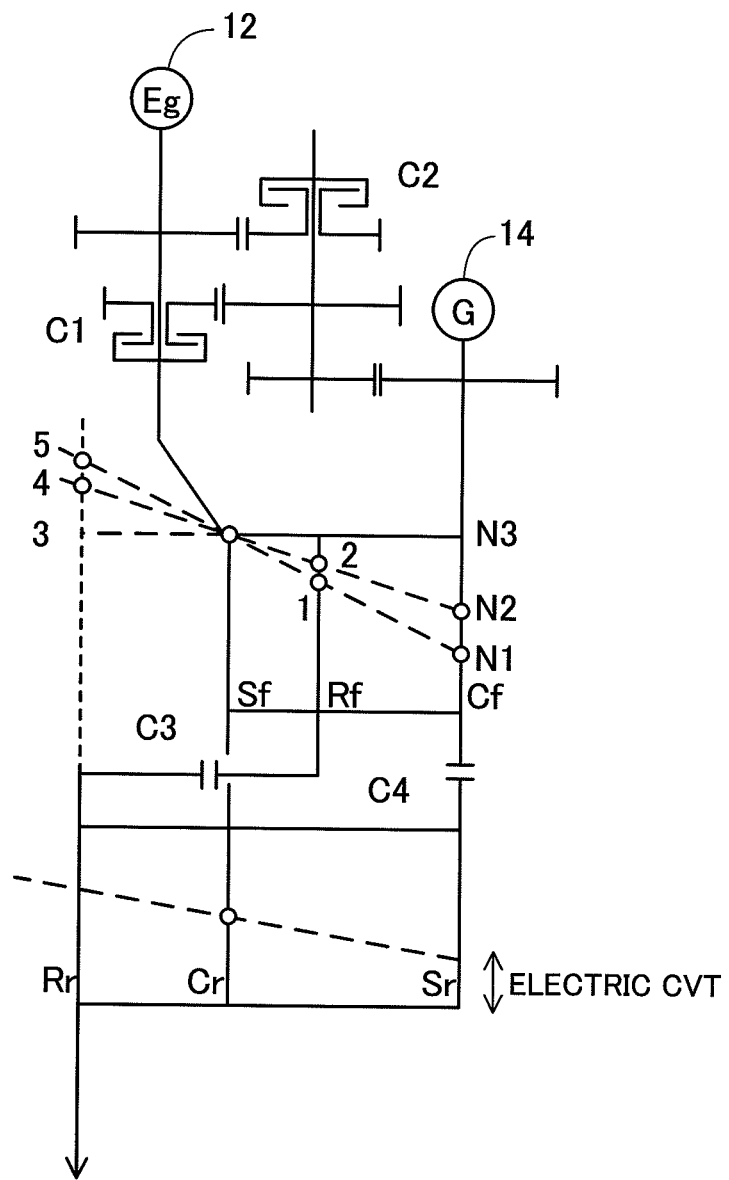
FIG. 2 is a velocity diagram of first and second planetary gear mechanisms, etc., of the apparatus shown in FIG. 1.

FIG. 2 is a velocity diagram of the first and second planetary gear mechanisms 24, 26 (whose operation is controlled by the ECU 60), etc., of the apparatus 10 shown in FIG. 1.

FIG. 3 is a table showing engagement of the clutches Cn used for establishing gear positions in the apparatus 10 shown in FIG. 1. In FIG. 3, a circle means the clutch Cn is engaged and no circle means the clutch Cn is released.

In the velocity diagram of FIG. 2, three vertical lines correspond to three elements of the first and second planetary gear mechanisms 24, 26 and the length extending upward represents the rotational speed in the forward running direction. The distance between the vertical lines is proportional to a reciprocal of the number of teeth of the sun gear Sf, Sr or ring gear Rf, Rr.

The explanation will be made. When the first and third clutches (C1, C3) 50, 54 are engaged, the first speed (1) is established.

Specifically, the rotation of the input shaft 16 inputted from the engine 12 is directly transmitted to the sun gear Sf of the first planetary gear mechanism 24, while, since the first clutch (C1) 50 is engaged, it is reduced in speed through the gears 40, 42 and then transmitted to the rotor 14b of the motor/generator 14. In FIG. 2, N1 indicates the rotation of the carrier Cf in this case.

Therefore, in the first planetary gear mechanism 24, the rotation of the ring gear Rf is determined in accordance with the rotation of the sun gear Sf and that of the carrier Cf as shown in FIG. 2. Since the third clutch (C3) 54 is engaged, the output of the first planetary gear mechanism 24 is directly outputted from the ring gear Rr of the second planetary gear mechanism 26.

When the second and third clutches (C2, C3) 52, 54 are engaged, the second speed (2) is established.

In this case, although the rotation of the input shaft 16 inputted from the engine 12 is directly transmitted to the sun gear Sf of the first planetary gear mechanism 24 similarly to the above case, since the second clutch (C2) 52 is engaged, the rotation is reduced in speed through the gears 44, 42 by an amount smaller than that of when the gear position is in the first speed and then transmitted to the carrier Cf and the rotor 14b of the motor/generator 14. In FIG. 2, N2 indicates the rotation of the carrier Cf in this case.

As shown in FIG. 2, since the third clutch (C3) 54 is engaged, the output of the first planetary gear mechanism 24 is directly outputted from the ring gear Rr of the second planetary gear mechanism 26.

When the third and fourth clutches (C3, C4) 54, 56 are engaged, the third speed (3) is established.

In this case, the rotation of the input shaft 16 inputted from the engine 12 is directly transmitted to the sun gear Sf of the first planetary gear mechanism 24 and directly transmitted to the carrier Cr of the second planetary gear mechanism 26.

Note that, in this embodiment, the first and second planetary gear mechanisms 24, 26 are configured such that rotational speeds of the engine 12 and motor/generator 14 are become identical at the rotational speed of N3 in the third speed.

Since both of the third and fourth clutches (C3, C4) 54, 56 are engaged, the first and second planetary gear mechanisms 24, 26 come together (integrated) and the rotation is outputted from the ring gear Rr of the second planetary gear mechanism 26.

When the second and fourth clutches (C2, C4) 52, 56 are engaged, the fourth speed (4) is established.

Similarly to the case of the second speed, the rotation is outputted from the ring gear Rr of the second planetary gear mechanism 26. The rotation of the sun gear Sr of the second planetary gear mechanism 26 is determined in accordance with the rotation of the carrier Cf indicated by N2 in FIG. 2, and consequently, the rotation of the ring gear Rr of the second planetary gear mechanism 26 is determined and outputted.

When the first and fourth clutches (C1, C4) 50, 56 are engaged, the fifth speed (5) is established.

Similarly to the case of the first speed, the rotation is outputted from the ring gear Rr of the second planetary gear mechanism 26. The rotation of the sun gear Sr of the second planetary gear mechanism 26 is determined in accordance with the rotation of the carrier Cf indicated by N1 in FIG. 2, and consequently, the rotation of the ring gear Rr of the second planetary gear mechanism 26 is determined and outputted.

As indicated "R-EV" in FIG. 3, a gear position of reverse (R) running is established by stopping the engine 12, reversely rotating the motor/generator 14, and engaging the first and third clutches (C1, C3) 50, 54 similarly to the case of the first speed.

The foregoing is to operate the engine 12 (and the motor/generator 14) to establish any given gear position. In place of the engine 12, i.e., in EV, it is also possible to operate only the motor/generator 14 to output rotations corresponding to the first to fifth speeds from the ring gear Rr of the second planetary gear mechanism 26, as described "EV possible" in FIG. 3.

In this case, the engine 12 is stopped, but the motor/generator 14 is operated and the clutches Cn are engaged in accordance with FIG. 3. As a result, the rotation corresponding to a gear position of any of the first to fifth speeds can be outputted from the ring gear Rr of the second planetary gear mechanism 26.

Further, as indicated "electric CVT" (i.e., continuous or step-less variable transmission operation (control) through the ECU 60 similar to the operation using a CVT (Continuous Variable Transmission)) in FIG. 2, the electric CVT is possible in the illustrated configuration.

Specifically, it becomes possible to make the ring gear Rr to output the rotation corresponding to a desired ratio if the engine 12 and motor/generator 14 are operated and the fourth clutch (C4) 56 is engaged such that the rotation of the carrier Cf of the first planetary gear mechanism 24 is inputted (transmitted) to the sun gear Sr of the second planetary gear mechanism 26, so as to increase/decrease the rotational speed of the sun gear Sr as shown at the bottom of FIG. 2.

Thus, the first embodiment is configured to have an apparatus for driving a hybrid vehicle having an internal combustion engine (Eg; 12) an electric rotating machine (G; motor/generator 14) and wheels (20), comprising: an input shaft (16) connected to the engine; an output shaft (22) connected to the wheels; a first planetary gear mechanism (24) of a double pinion type whose sun gear (Sf) is connected to the input shaft; a second planetary gear mechanism (26) of a single pinion type whose carrier (Cr) is connected to the input shaft; a speed-reduction mechanism (Gr) adapted to reduce rotation of the input shaft in speed and transmit it to a carrier (Cf) of the first planetary gear mechanism; a clutch (C4; 56) adapted to connect/disconnect the carrier (Cf) of the first planetary gear mechanism and a sun gear (Sr) of the second planetary gear mechanism; and a clutch (C3; 54) adapted to connect/disconnect a ring gear (Rf) of the first planetary gear mechanism and a ring gear (Rr) of the second planetary gear mechanism; wherein the ring gear (Rr) of the second planetary gear mechanism is connected to the output shaft and the electric rotating machine is connected to the carrier (Cf) of the first planetary gear mechanism.

The apparatus further includes: a hydraulic pressure supply device (58) adapted to supply hydraulic pressure to the clutches to connect; and a controller (ECU; 60) that controls operation of the engine (12), rotating machine (14) and hydraulic pressure supply device (58) to establish a transmission speed (n-th speed) in accordance with running condition of the vehicle.

With this, since the vehicle running only with the engine 12 is made possible, it becomes possible to avoid the degradation in operation efficiency that the energy always passes through the electrical system.

Specifically, since there are provided with the third and fourth clutches (C3, C4) 54, 56 and the speed-reduction mechanism Gr (gears 40, 42, 44, first and second clutches (C1, C2) 50, 52) that can reduce the rotation of the input shaft 16 in speed and transmit it to the carrier (Cf) of the first planetary gear mechanism 24, it becomes possible to establish a fixed gear position by engaging at least two of the first and second clutches (C1, C2) of the speed-reduction mechanism Gr and the third and fourth clutches (C3, C4), so that the vehicle can run only with the engine 12, thereby avoiding the degradation in operation efficiency.

Further, since the motor/generator (G) 14 is connected to the carrier Cf of the first planetary gear mechanism 24 that decreases in its differential rotation as the gear ratio becomes higher, it becomes possible to decrease an amount of dragged rotation by the motor/generator (G) 14 as the gear ratio becomes higher, thereby improving the operation efficiency on the high ratio side when the vehicle runs with the engine 12.

To be more specific, as shown in FIG. 2, the rotational speed of the carrier Cf is decreased like N3, N2 and then N1 as the ratio becomes higher, i.e., third, fourth and then fifth speed. In other words, an amount of dragged rotation amount caused by the rotation by the motor/generator (G) 14 can be decreased as the ratio becomes higher, thereby improving the operation efficiency on the high ratio side when the vehicle runs with the engine 12.

Further, when the operation mode is switched, it becomes possible to increase the rotational speed of the motor/generator (G) 14 at a low speed where power generation is needed, while it becomes possible to decrease the rotational speed of the motor/generator (G) 14 during running with the engine 12, thereby improving the efficiency of the engine 12 operation.

In the apparatus, the speed-reduction mechanism (Gr) comprises a clutch (C1, C2; 50, 52) adapted to connect/disconnect the input shaft and the carrier (Cf) of the first planetary gear mechanism in response to a running condition of the vehicle. With this, the vehicle can run only with the engine 12 with a fixed gear ratio in accordance with the vehicle running condition, thereby further reliably avoiding the degradation in efficiency.

Figure 4:
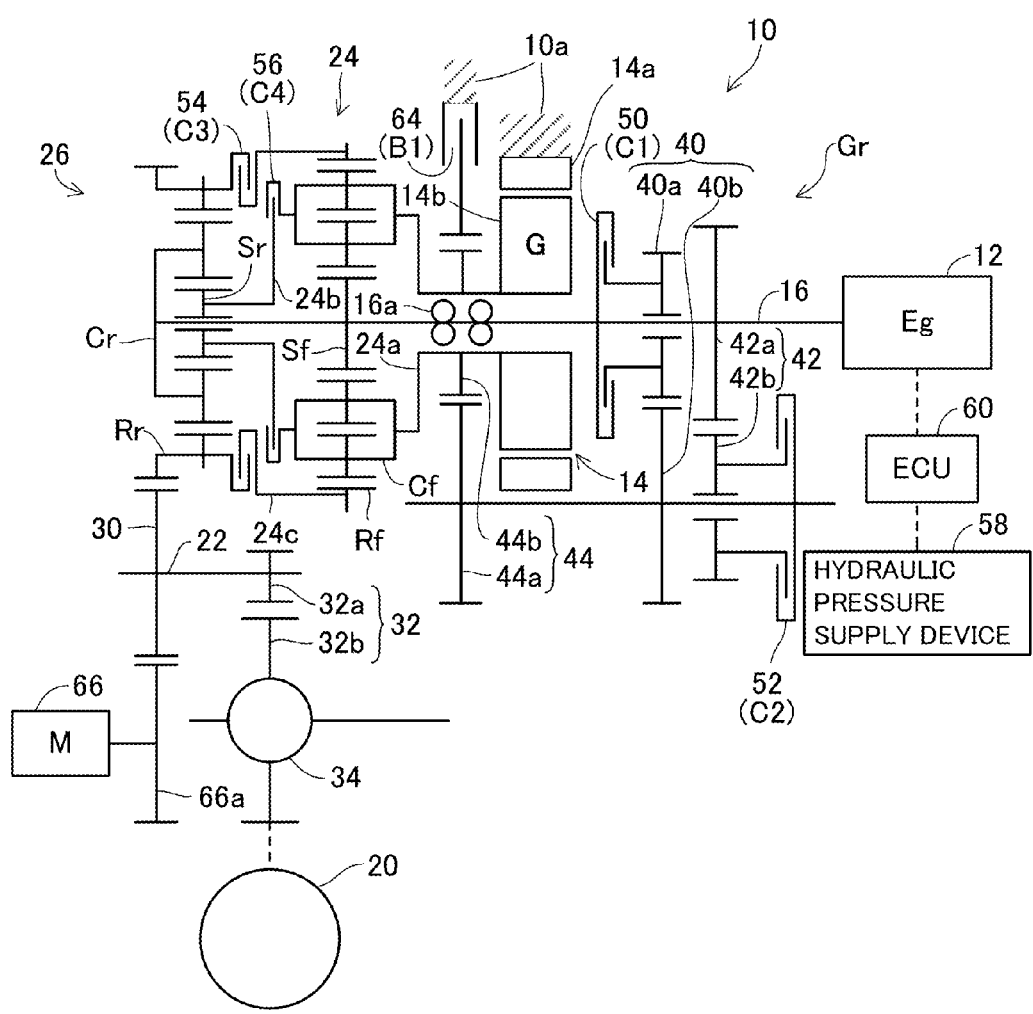
FIG. 4 is an overall view similar to FIG. 1, but schematically showing a driving apparatus for a hybrid vehicle according to a second embodiment of the invention.

FIG. 4 is an overall view similar to FIG. 1, but schematically showing a driving apparatus for a hybrid vehicle according to a second embodiment of the invention.

In the second embodiment, constituent elements corresponding to those of the first embodiment are assigned by the same reference symbols as those in the first embodiment and will not be explained.

The explanation will be made with focus on points of difference from the first embodiment. In the second embodiment, there is provided a brake (B1) 64 for engaging the carrier Cf of the first planetary gear mechanism 24, more exactly the connection member 24a thereof to the apparatus housing 10a.

Further, in addition to the first motor/generator 14, a second motor/generator (also electric rotating machine; indicated by "M") 66 is installed to be connected to the output shaft 22.

Similarly to the first motor/generator 14, the second motor/generator 66 comprises a motor/generator constituted as a brushless AC synchronous motor, and serves as a motor when rotated with the current supply and as a generator when rotated by the engine 12 (or the wheel 20). The motor/generator 66 is connected to the output shaft 22 through a gear 66a to be meshed with the reduction gear 30.

Figure 5:
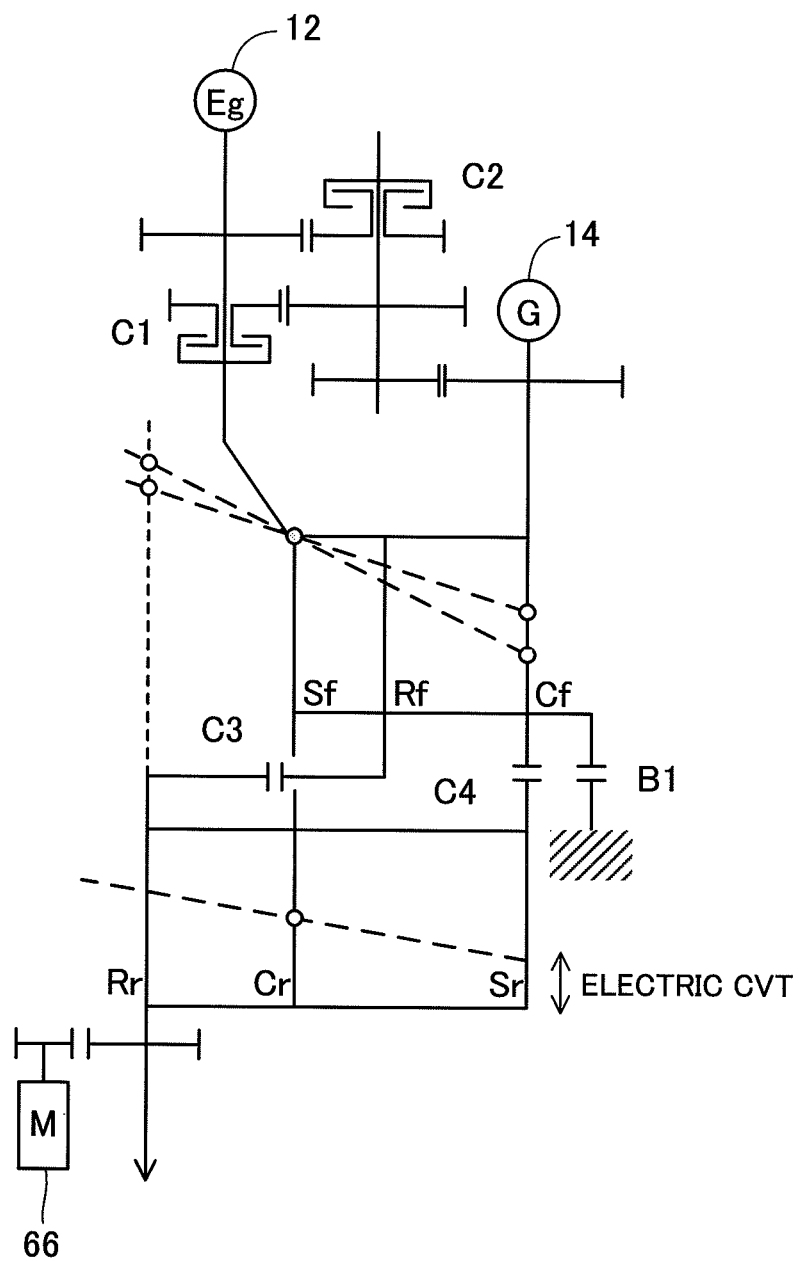
FIG. 5 is a velocity diagram of first and second planetary gear mechanisms, etc., of the apparatus shown in FIG. 4.

FIG. 5 is a velocity diagram of the first and second planetary gear mechanisms 24, 26, etc., of the apparatus 10 shown in FIG. 4 and FIG. 6 is a table showing engagement of the clutches Cn used for establishing gear positions in the apparatus shown in FIG. 4.

Figure 7:
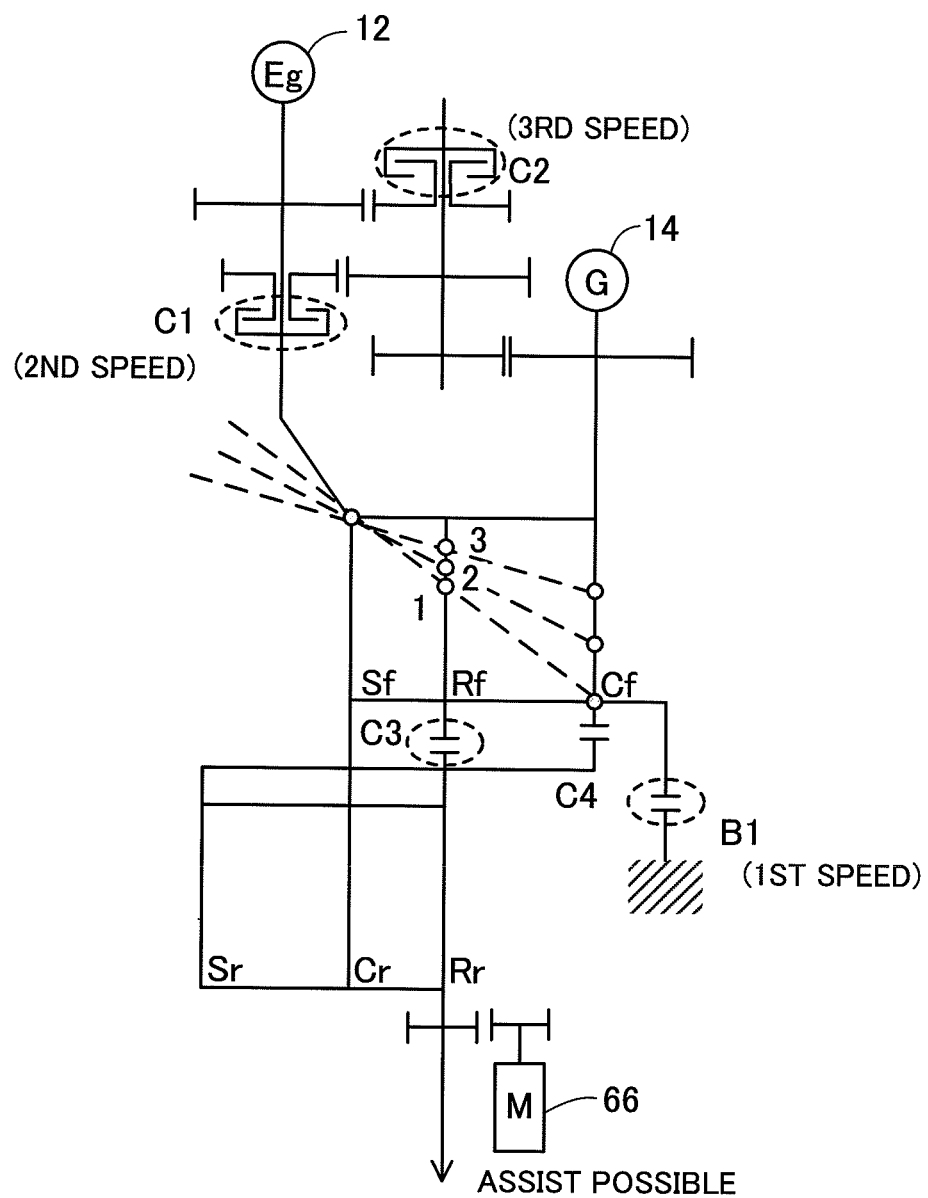
FIG. 7 is a velocity diagram similar to FIG. 5, but showing details of establishing gear positions of first to third speeds in the second embodiment.
Figure 8:
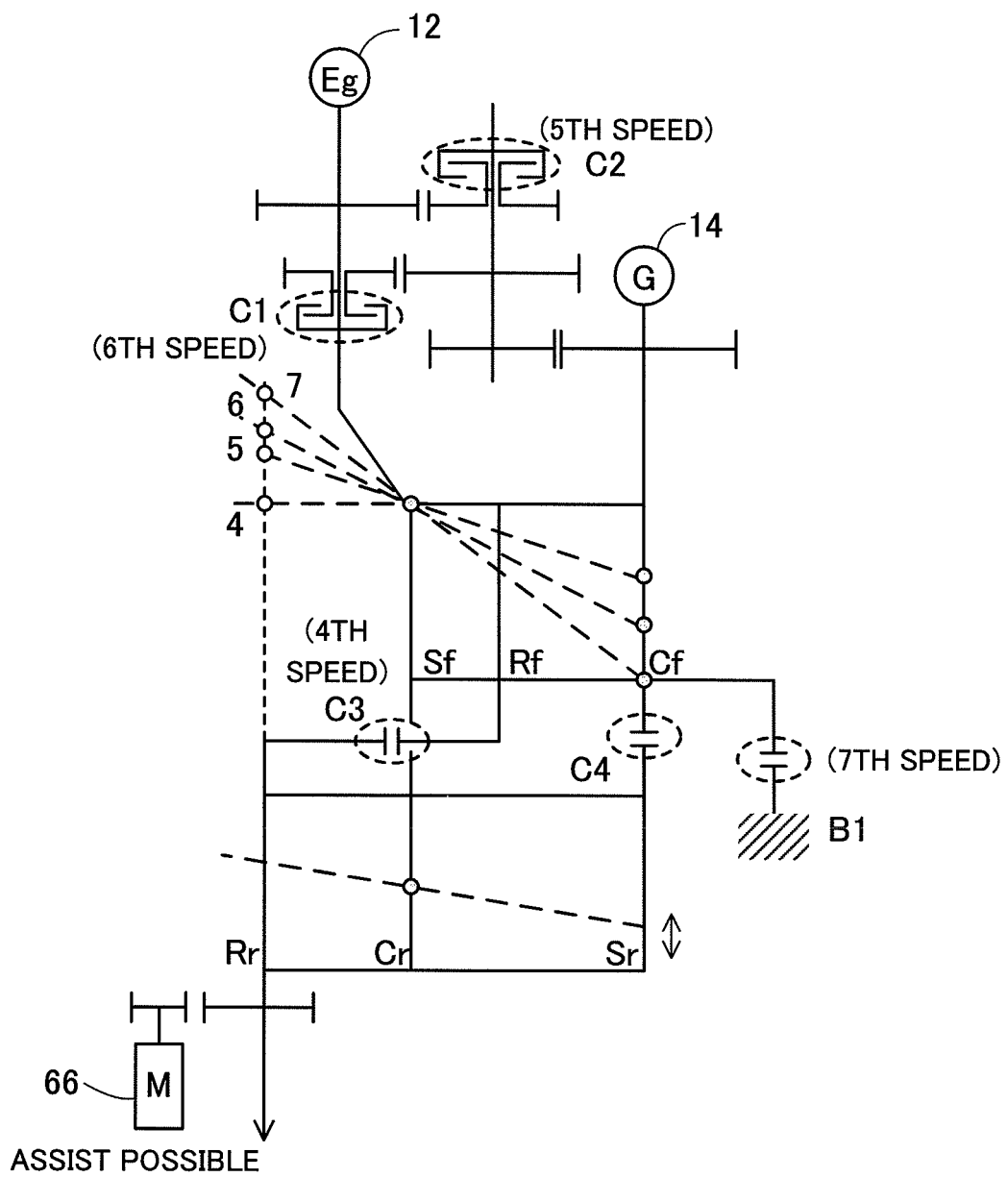
FIG. 8 is a velocity diagram similar to FIG. 5, but showing details of establishing gear positions of fourth to seventh speeds in the second embodiment.

In the second embodiment, as shown in FIG. 6, the gears have the first to seventh speeds. FIG. 7 is a velocity diagram similar to FIG. 5, but showing details of establishing the first to third speeds and FIG. 8 is for the fourth to seventh speeds.

The explanation on the second embodiment will be made. When the brake (B1) 64 is engaged (fixed) in place of the first clutch (C1) 50 and the third clutch (C3) 54 is engaged, the first speed (1) is established.

Specifically, when the brake (B1) 64 is engaged, the carrier Cf of the first planetary gear mechanism (Pf) 24 is fastened to the housing 10a and consequently, the motor/generator (G) 14 is also stopped. In FIG. 7, the rotation of the ring gear Rf is indicated by 1 (first speed). Since the third clutch (C3) 54 is engaged, the output of the first planetary gear mechanism 24 is directly outputted from the ring gear Rr of the second planetary gear mechanism 26.

The establishments of the second to sixth speeds are the same as those of the first to fifth speeds in the first embodiment. Specifically, in the second embodiment, the first and second planetary gear mechanisms 24, 26 are configured such that the engine 12 and motor/generator 14 are rotated at the identical rotational speed in the fourth speed.

When the brake (B1) 64 and fourth clutch (C4) 56 are engaged, the seventh speed (7) is established. Specifically, the rotation of the carrier Cf of the first planetary gear mechanism 24 (that is the same as in the first speed) is inputted to the sun gear Sr of the second planetary gear mechanism 26 and then outputted from the ring gear Rr.

A gear position of reverse (R) running is established by engaging the first and third clutches (C1, C3) 50, 54 similarly to the first embodiment.

Figure 9:
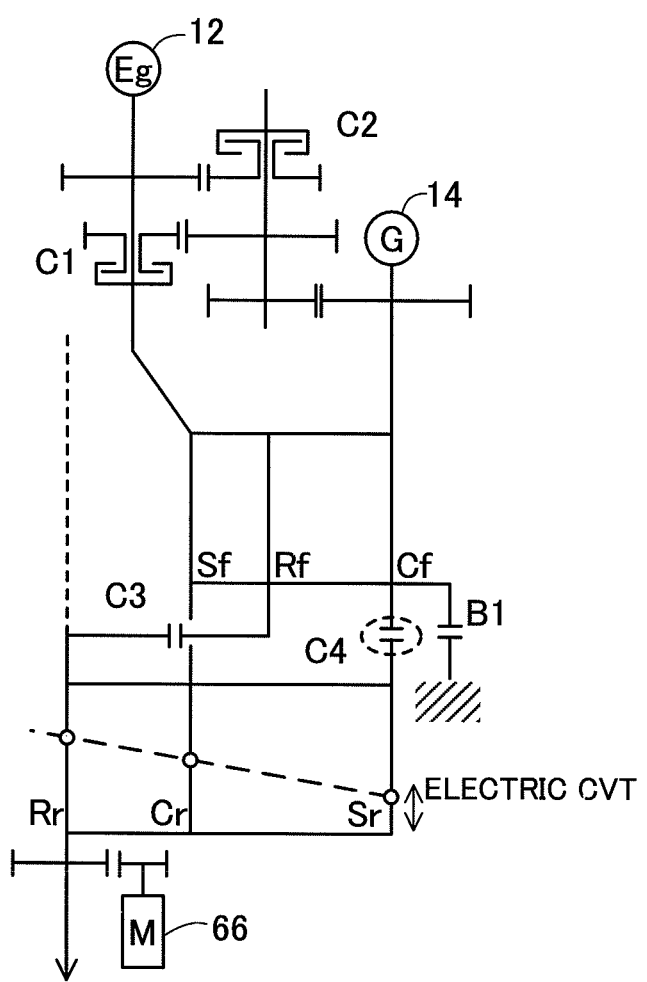
FIG. 9 is a velocity diagram similar to FIG. 5, but showing the operation of electric CVT running in the second embodiment.

Next the explanation on the electric CVT will be made. FIG. 9 is a velocity diagram similar to FIG. 5, but showing the operation thereof.

In the second embodiment, similarly to the first embodiment, it become possible to make the ring gear Rr to output the rotation corresponding to a desired ratio if the engine 12 and motor/generator 14 are operated and the fourth clutch (C4) 56 is engaged such that the rotation of the carrier Cf of the first planetary gear mechanism 24 is inputted or transmitted to the sun gear Sr of the second planetary gear mechanism 26, so as to increase/decrease the rotational speed of the sun gear Sr as shown at the bottom of FIG. 9.

Figure 10:
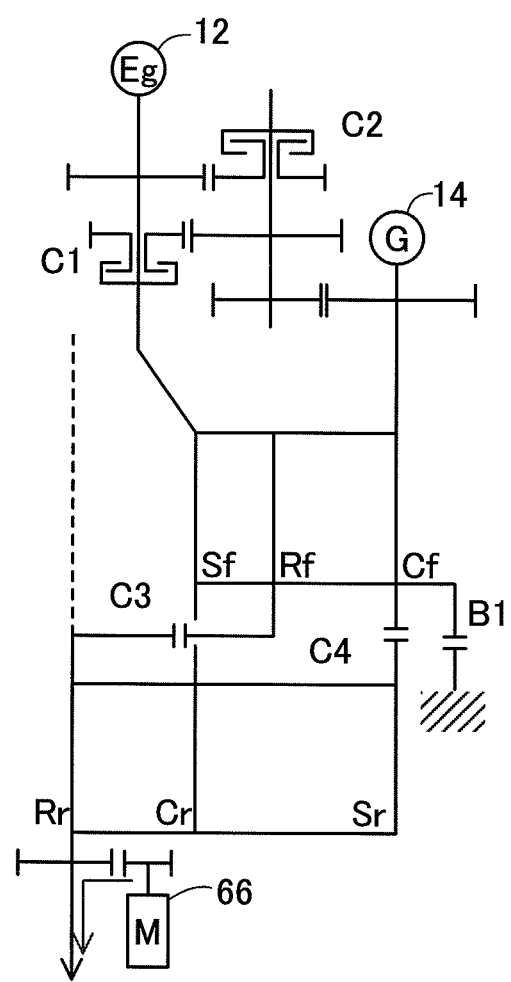
FIG. 10 is a velocity diagram similar to FIG. 5, but showing the operation of Electric Vehicle (EV) running in the second embodiment.

Next the explanation on Electric Vehicle (EV) running will be made. FIG. 10 is a velocity diagram similar to FIG. 5, but showing the operation thereof.

In the second embodiment, since the second motor/generator 66 is provided in addition to the first motor/generator 14, the EV running can be easily achieved by operating the second motor/generator 66 as shown in FIG. 9.

In this case, the engine 12 may be operated or stopped. Also, similarly to the first embodiment, it is possible to achieve the EV running by operating the first motor/generator 14. It is further possible to enhance the EV running performance by operating both of the second and first motor/generators 66, 14.

Figure 11:
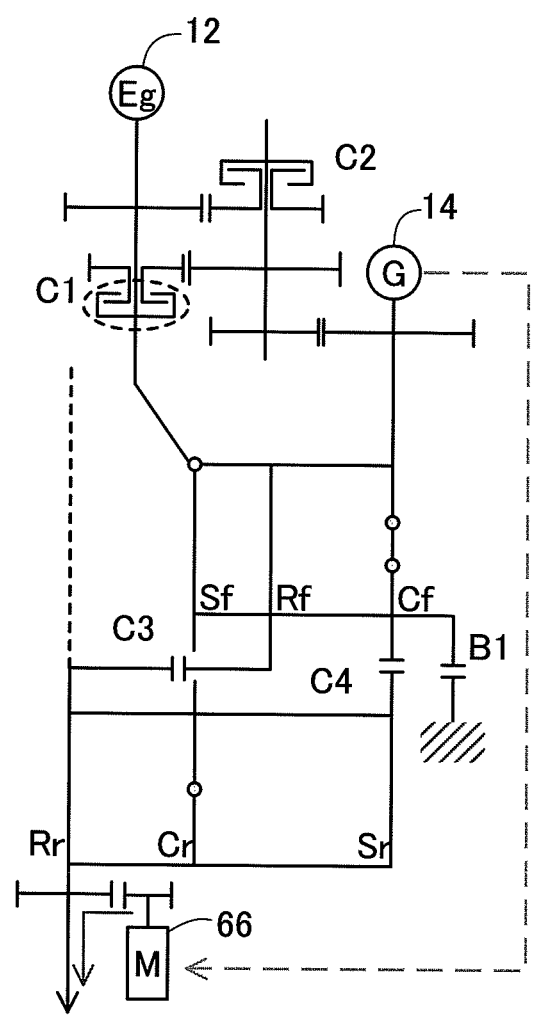
FIG. 11 is a velocity diagram similar to FIG. 5, but showing the operation of series EV running in the second embodiment.

Next the explanation on series EV running, i.e., the vehicle running with power generation will be made. FIG. 11 is a velocity diagram similar to FIG. 5, but showing the operation thereof.

In this case, the first clutch (C1) 50 (or the second clutch (C2) 52) is engaged to operate the first motor/generator 14 at reduced rotational speed to generate power. The electric energy generated by the motor/generator 14 is stored in the energy storage (not shown), or supplied to itself or to the second motor/generator 66 as indicated by dashed line in FIG. 11.

The reverse (R) running is done by stopping the engine 12 and reversely rotating the second motor/generator 66. The same purpose can be achieved by engaging the first and third clutches (C1, C3) 50, 54 and reversely rotating the first motor/generator 14.

Figure 12:
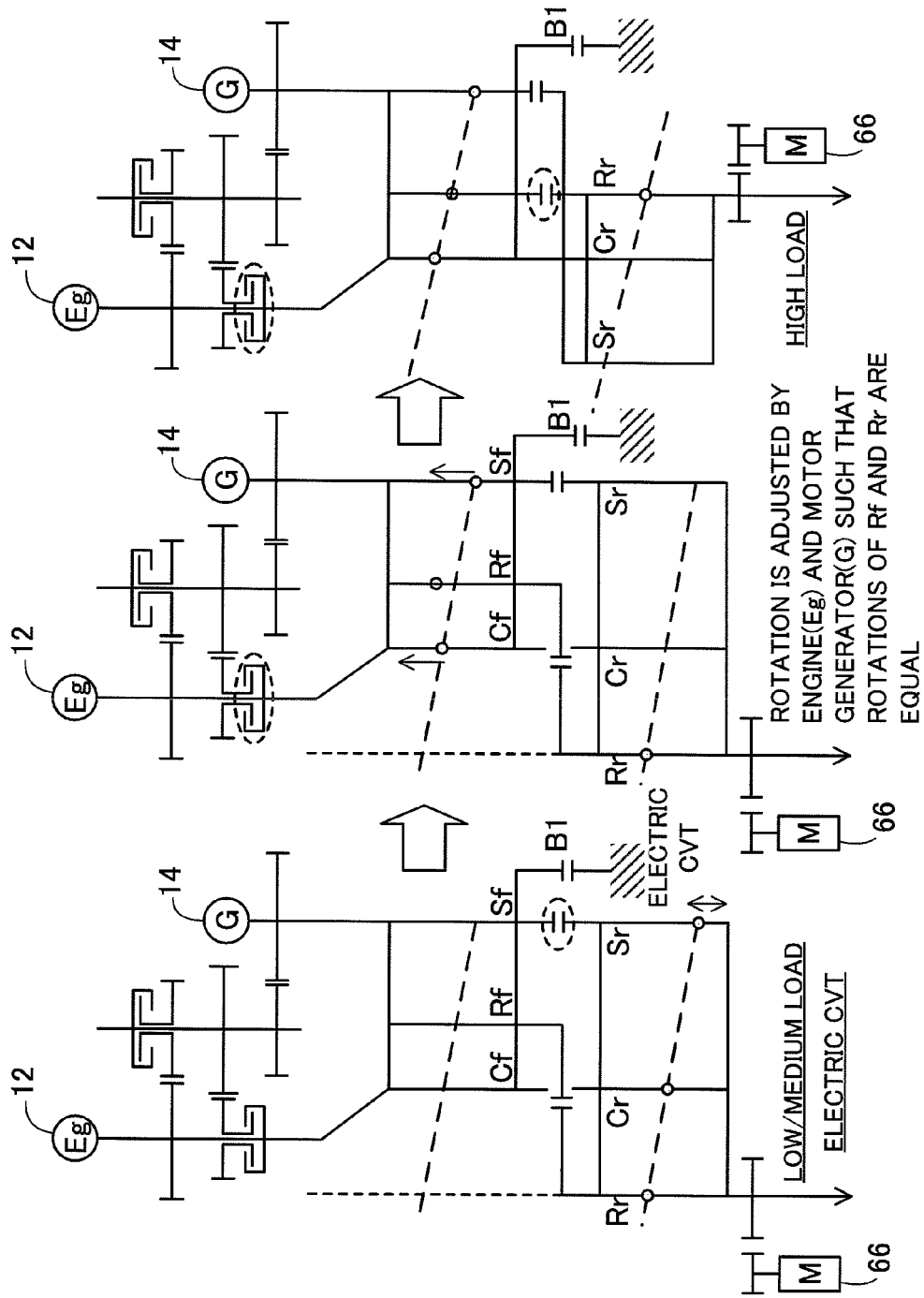
FIG. 12 is a velocity diagram similar to FIG. 5, but showing the operation in the case where the vehicle running mainly with an electric CVT is switched to that mainly with an internal combustion engine during low/medium speed running in the second embodiment.
Figure 13:
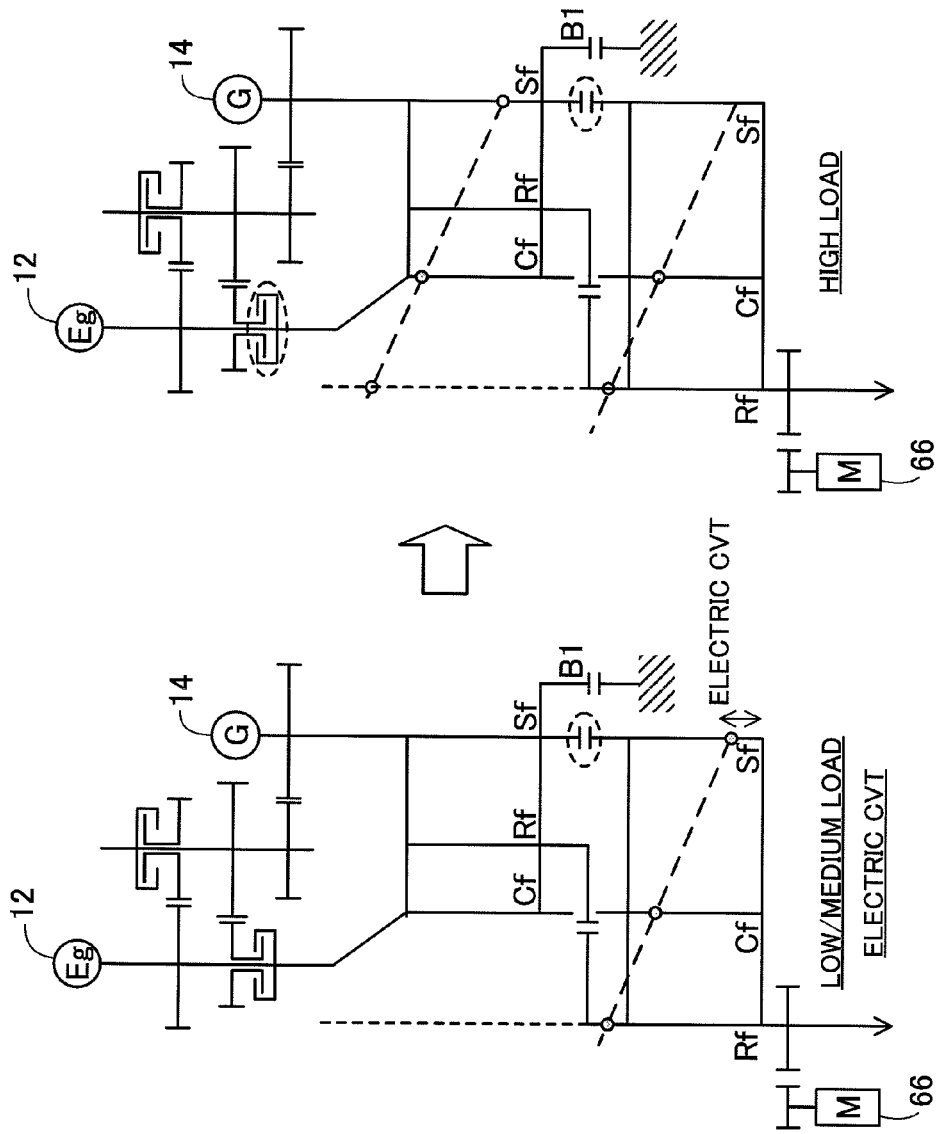
FIG. 13 is a velocity diagram similar to FIG. 5, but showing the operation in the case where the vehicle running mainly with the electric CVT is switched to that mainly with the engine during medium/high speed running in the second embodiment.

Next the switching from the vehicle running with electric CVT to the vehicle running mainly with the engine 12 will be explained. FIG. 12 is a velocity diagram similar to FIG. 5, but showing the operation thereof during the vehicle running at low/medium speed in any of the first to third speeds and FIG. 13 is that during the vehicle running at medium/high speed in any of the fourth to seventh speeds.

To be more specific, this will be the case where the vehicle runs mainly with the motor/generator 14 under low/medium load, but it runs mainly with the engine 12 under high load.

In this case, as shown in FIG. 12, the rotation of the engine 12 and that of the motor/generator 14 are controlled such that the rotation of the ring gear Rf of the first planetary gear mechanism 24 and that of the ring gear Rr of the second planetary gear mechanism 26 correspond with each other (and also so that the engine speed corresponding to a desired gear position is achieved). This can be applied to the medium/high speed running.

The second embodiment is configured to have an apparatus for driving a hybrid vehicle having an internal combustion engine (Eg; 12) an electric rotating machine (G; motor/generator 14) and wheels (20), comprising: an input shaft (16) connected to the engine; an output shaft (22) connected to the wheels; a first planetary gear mechanism (24) of a double pinion type whose sun gear (Sf) is connected to the input shaft; a second planetary gear mechanism (26) of a single pinion type whose carrier (Cr) is connected to the input shaft; a speed-reduction mechanism (Gr) adapted to reduce rotation of the input shaft in speed and transmit it to a carrier (Cf) of the first planetary gear mechanism; a clutch (C4; 56) adapted to connect/disconnect the carrier (Cf) of the first planetary gear mechanism and a sun gear (Sr) of the second planetary gear mechanism; and a clutch (C3; 54) adapted to connect/disconnect a ring gear (Rf) of the first planetary gear mechanism and a ring gear (Rr) of the second planetary gear mechanism; wherein the ring gear (Rr) of the second planetary gear mechanism is connected to the output shaft and the electric rotating machine is connected to the carrier (Cf) of the first planetary gear mechanism.

The apparatus further includes: a hydraulic pressure supply device (58) adapted to supply hydraulic pressure to the clutches to connect; and a controller (ECU; 60) that controls operation of the engine (12), rotating machine (14), second rotating machine (66) and hydraulic pressure supply device (58) to establish a transmission speed (n-th speed) in accordance with running condition of the vehicle.

With this, since the vehicle running only with the engine 12 is made possible, it becomes possible to avoid the degradation in operation efficiency that the energy always passes through the electrical system.

Specifically, since there are provided with the third and fourth clutches (C3, C4) 54, 56 and the speed-reduction mechanism Gr (gears 40, 42, 44, first and second clutches (C1, C2) 50, 52) that can reduce the rotation of the input shaft 16 in speed and transmit it to the carrier (Cf) of the first planetary gear mechanism 24, the vehicle can run only with the engine 12, thereby avoiding the degradation in operation efficiency.

To be more specific, since the first and second planetary gear mechanisms 24, 26 are configured such that the rotational speed of the carrier Cf of the first planetary gear mechanism 24 becomes zero when the first speed is established as shown in FIG. 7, it becomes possible to run the vehicle only with the engine 12.

Further, since the motor/generator (G) 14 is connected to the carrier Cf of the first planetary gear mechanism 24 that decreases in its differential rotation as the gear ratio becomes higher, it becomes possible to decrease the rotational speed of the carrier Cf and decrease an amount of dragged rotation by the motor/generator (G) 14 as the gear ratio becomes higher like fifth, sixth and then seventh speed, thereby improving the operation efficiency on the high ratio side when the vehicle runs with the engine 12.

Further, when the operation mode is switched, it becomes possible to increase the rotational speed of the motor/generator (G) 14 at low speed where power generation is needed, whereas it becomes possible to lower the rotational speed of the motor/generator (G) 14 when the vehicle runs with the engine 12, thereby improving the efficiency of the engine 12 operation.

In the apparatus, the speed-reduction mechanism (Gr) comprises a clutch (C1, C2; 50, 52) adapted to connect/disconnect the input shaft and the carrier (Cf) of the first planetary gear mechanism in response to a running condition of the vehicle. With this, similarly to the first embodiment, the vehicle running only with the engine 12 with a fixed gear ratio is made possible in accordance with the vehicle running condition, thereby further reliably avoiding the degradation in operation efficiency.

The apparatus further includes: a brake (B1; 64) adapted to fasten the carrier (Cf) of the first planetary gear mechanism to an apparatus housing (10a). With this, in addition to the foregoing effects, it becomes possible to reliably decrease the amount of dragged rotation by the motor/generator (G) 14 at the highest ratio.

The apparatus further includes: a second electric rotating machine (M; 66) connected to the output shaft. With this, in addition to the foregoing effects, when the vehicle is started to run with the second motor/generator 66, it becomes possible to operate also the first motor/generator 14 to assist the second motor/generator 66 and therefore, the second motor/generator 66 can be made compact. Further, when the vehicle is accelerated, the second motor/generator 66 can be operated to improve the acceleration performance.

Further, when the vehicle runs with the second motor/generator 66, the engine 12 can drive the (first) motor/generator 14 to generate power, thereby charging electric energy.

Further, since the second motor/generator 66 is provided and the clutches (first and second clutches (C1, C2) 50, 52) of the speed-reduction mechanism Gr are engaged in accordance with the vehicle running condition, it becomes possible to suitably change the power generation efficiency depending on the running condition, i.e., between the case where the priority is assigned to the power generation and the case where the priority is assigned to fuel consumption efficiency of the engine 12.

Figure 14:
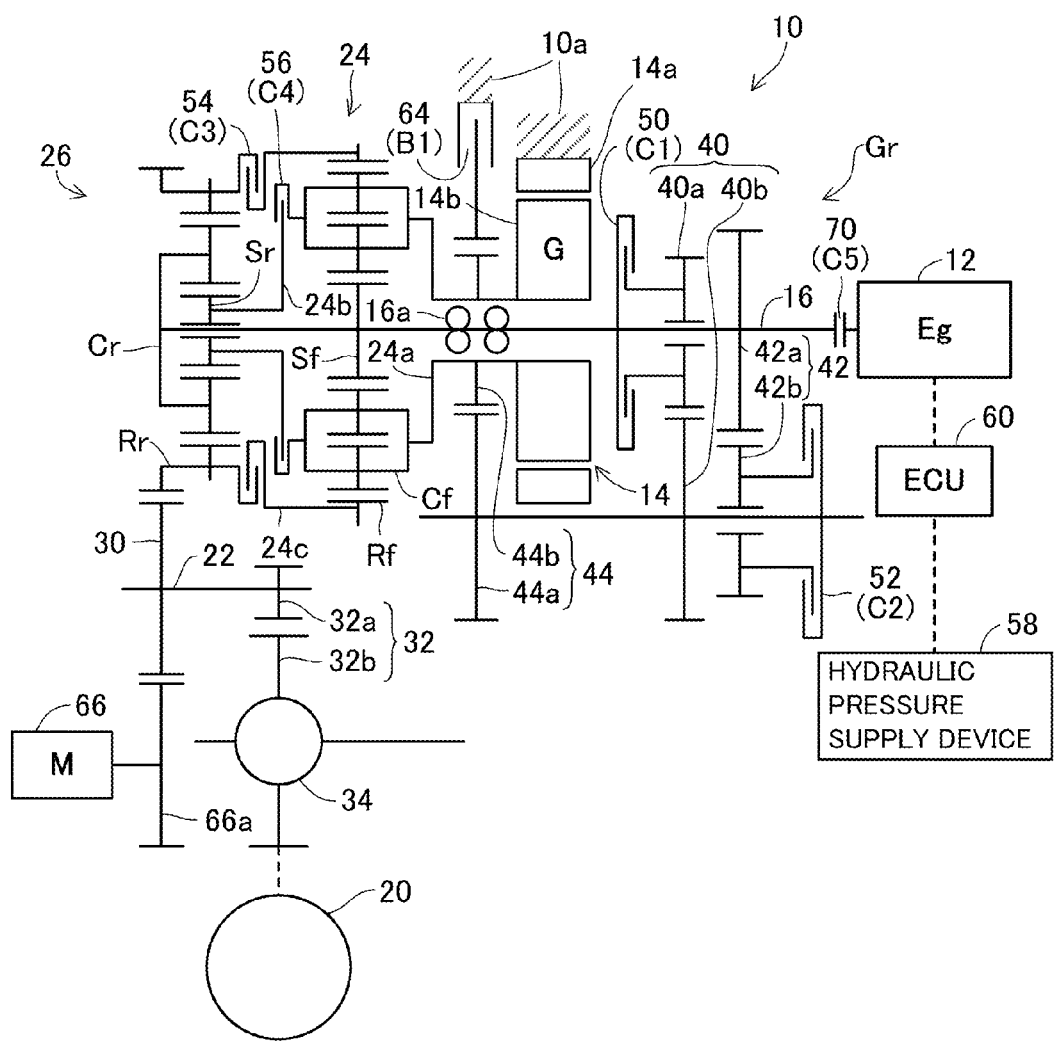
FIG. 14 is an overall view similar to FIG. 4, but schematically showing a driving apparatus for a hybrid vehicle according to a third embodiment of the invention.

FIG. 14 is an overall view similar to FIG. 4, but schematically showing a driving apparatus for a hybrid vehicle according to a third embodiment of the invention. In the third embodiment, constituent elements corresponding to those of the first and second embodiments are assigned by the same reference symbols and will not be explained.

The explanation will be made with focus on points of difference from the first and second embodiments. In the third embodiment, a fifth clutch (C5) 70 is installed between the engine 12 and the input shaft 16.

As a result, when the vehicle runs with the first motor/generator 14 (or the first and second motor/generators 14, 66), it becomes possible to prevent the engine 12 from acting as load by cutting the connection between the engine 12 and the input shaft 16. Hence, it becomes possible to reduce the power consumption during the vehicle running with the motor/generator 14 (or 14 and 66). The remaining configuration is the same as that in the first and second embodiments.

Figure 15:
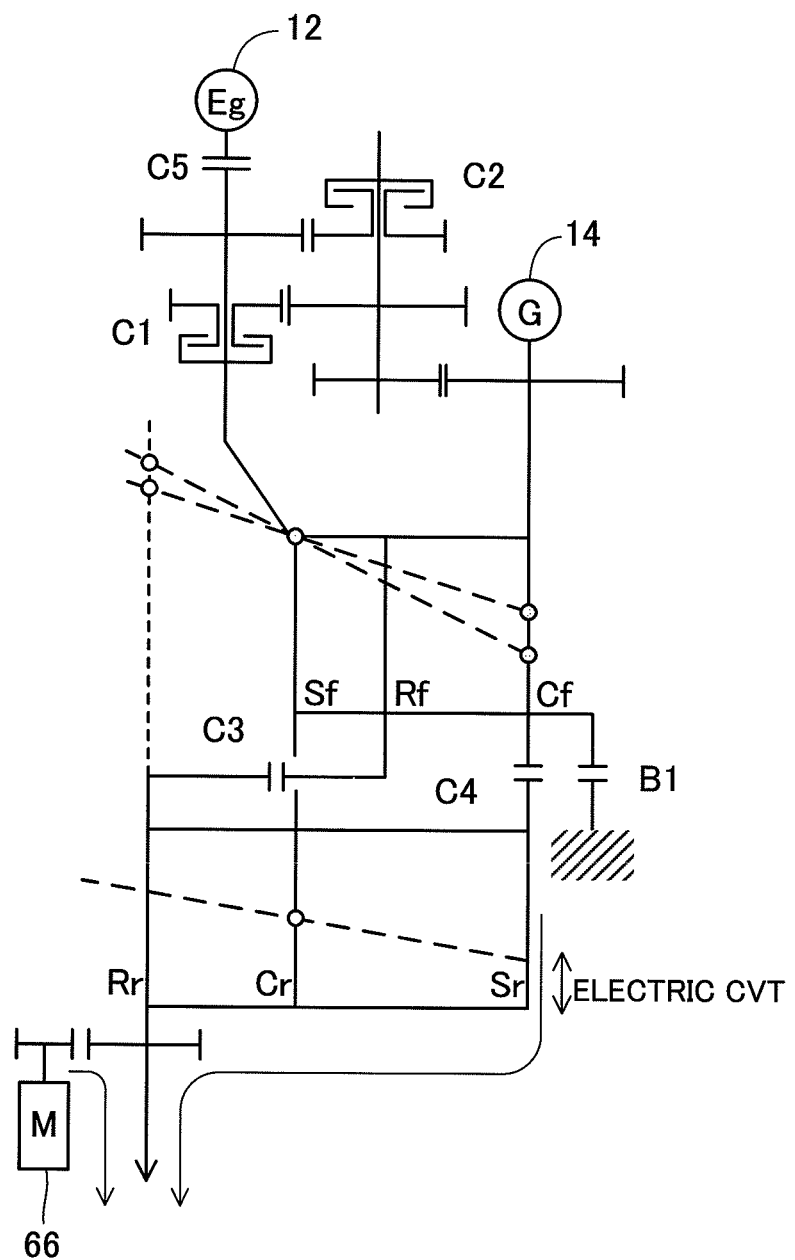
FIG. 15 is a velocity diagram of first and second planetary gear mechanisms, etc., of the apparatus according to the third embodiment.

FIG. 15 is a velocity diagram of the first and second planetary gear mechanisms 24, 26, etc., of the apparatus 10 according to the third embodiment and FIG. 16 is a table showing engagement of clutches used for establishing gear positions.

As can be seen in FIG. 16, when the third and fourth clutches (C3, C4) 54, 56 are engaged so that the vehicle runs with the first motor/generator 14 (or the first and second motor/generators 14, 66) in the EV running mode, upon releasing the fifth clutch (C5) 70, it becomes possible to prevent the engine 12 from being dragged (acting as load), thereby reducing the power consumption.

As shown in FIG. 15, since the vehicle running with both the first and second motor/generators 14, 66 are made possible at the time of vehicle starting at the EV running mode and the like, the motor size can be made compact, similarly to the second embodiment.

Figure 17:
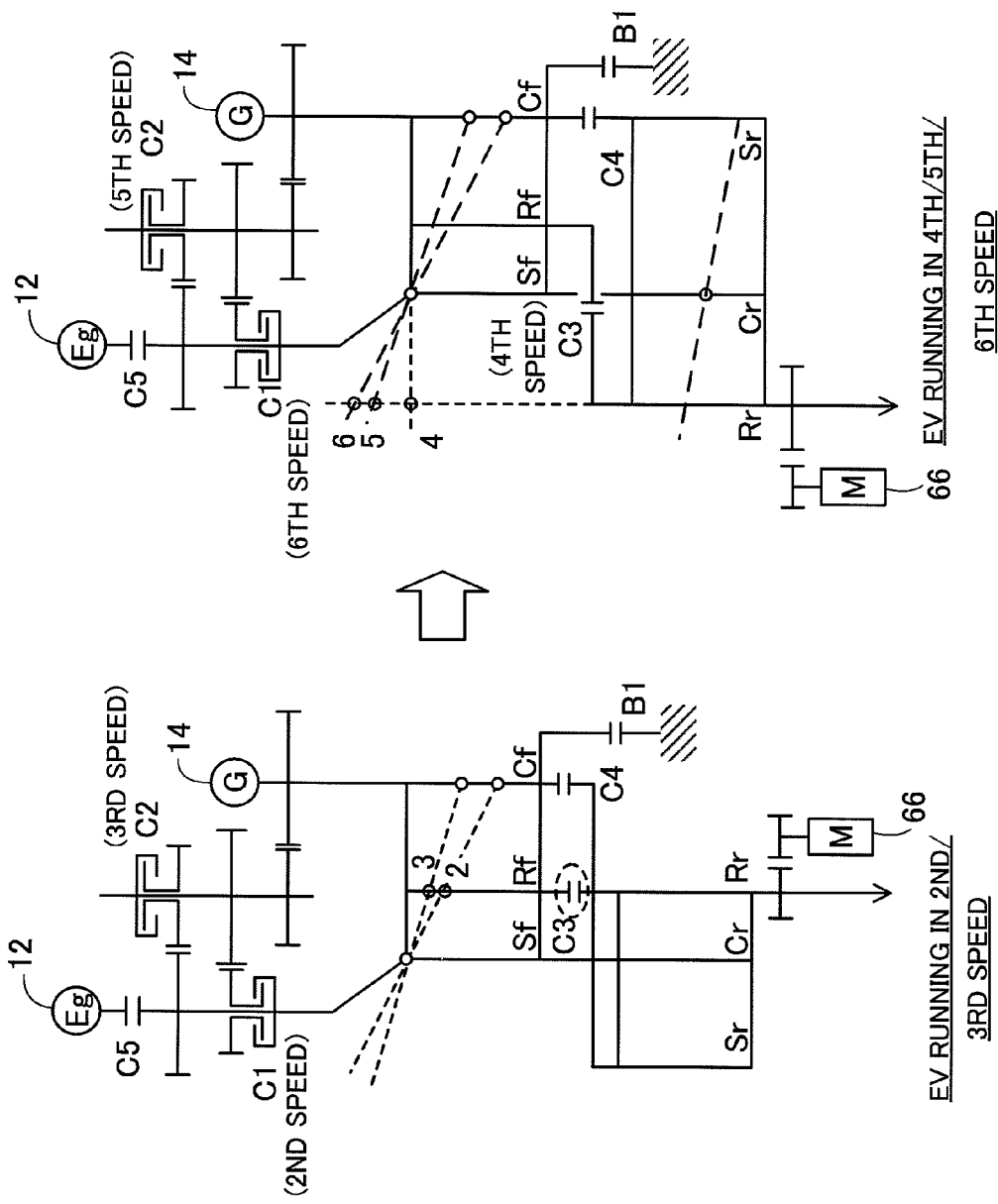
FIG. 17 is a velocity diagram similar to FIG. 12, but showing the operation of EV running with the second and third speeds and the fourth to sixth speeds in the third embodiment.
Figure 18:
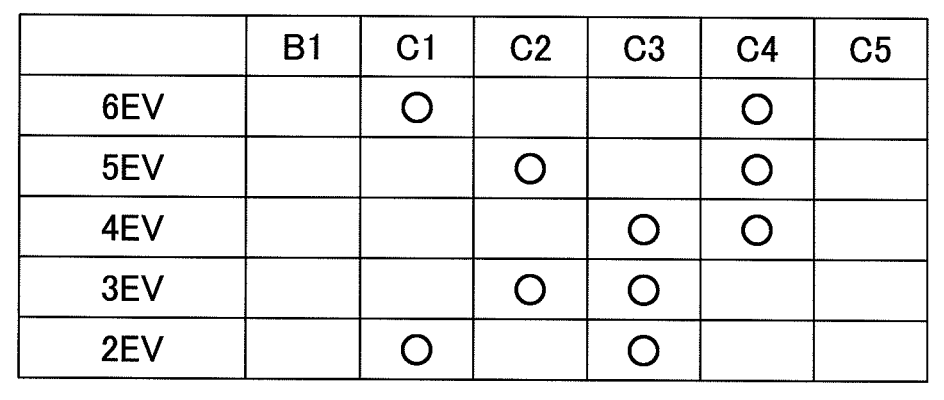

FIG. 17 is a velocity diagram similar to FIG. 12, but showing the operation of the EV travel with the second and third speeds and the fourth to sixth speeds in the third embodiment and FIG. 18 is a table showing engagement of the clutches used for establishing gear positions during the operation.

In the third embodiment, similarly to the first and second embodiments, the planetary gear mechanisms 24, 26 are of split type. Therefore, as shown in FIGS. 17 and 18, fixed gear ratios can be established not with the engine 12 but with the first motor/generator 14 as the prime mover. In this case, upon releasing the fifth clutch (C5) 70, the power consumption can be reduced.

Note that although the third embodiment is configured by adding the fifth clutch (C5) 70 to the structure of the second embodiment, the third embodiment may be configured by adding the fifth clutch (C5) 70 to the structure of the first embodiment.

The third embodiment is configured to have an apparatus for driving a hybrid vehicle having an internal combustion engine (Eg; 12) an electric rotating machine (G; motor/generator 14) and wheels (20), comprising: an input shaft (16) connected to the engine; an output shaft (22) connected to the wheels; a first planetary gear mechanism (24) of a double pinion type whose sun gear (Sf) is connected to the input shaft; a second planetary gear mechanism (26) of a single pinion type whose carrier (Cr) is connected to the input shaft; a speed-reduction mechanism (Gr) adapted to reduce rotation of the input shaft in speed and transmit it to a carrier (Cf) of the first planetary gear mechanism; a clutch (C4; 56) adapted to connect/disconnect the carrier (Cf) of the first planetary gear mechanism and a sun gear (Sr) of the second planetary gear mechanism; and a clutch (C3; 54) adapted to connect/disconnect a ring gear (Rf) of the first planetary gear mechanism and a ring gear (Rr) of the second planetary gear mechanism; wherein the ring gear (Rr) of the second planetary gear mechanism is connected to the output shaft and the electric rotating machine is connected to the carrier (Cf) of the first planetary gear mechanism.

With this, since the vehicle running only with the engine 12 is made possible, it becomes possible to avoid the degradation in efficiency that the energy always passes through the electrical system.

The apparatus further includes: a clutch (C5; 70) installed at a location between the engine (Eg) and the input shaft (16). With this, when the vehicle runs with at least the motor/generator (the first motor/generator (rotating machine G) 14 or the second motor/generator (rotating machine M) 66, or the both), it becomes possible to prevent the engine 12 from acting as load by cutting the connection between the engine 12 and the input shaft 16. Hence, it becomes possible to reduce the power consumption during the vehicle running with the motor/generator.

It should be noted that, in the foregoing, although the motor/generator 14 is installed on the input shaft 16, it could be installed on the intermediate shaft 36 or the like instead.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for driving a hybrid vehicle having an internal combustion engine, an electric rotating machine and wheels, comprising:
    an input shaft connected to the engine;
    an output shaft connected to the wheels;
    a first planetary gear mechanism of a double pinion type having a sun gear connected to the input shaft;
    a second planetary gear mechanism of a single pinion type having a carrier connected to the input shaft;
    a speed-reduction mechanism adapted to reduce rotational speed of the input shaft and transmit rotation to a carrier of the first planetary gear mechanism;
    a clutch adapted to connect/disconnect the carrier of the first planetary gear mechanism and a sun gear of the second planetary gear mechanism; and
    a clutch adapted to connect/disconnect a ring gear of the first planetary gear mechanism and a ring gear of the second planetary gear mechanism;
    wherein the ring gear of the second planetary gear mechanism is connected to the output shaft and the electric rotating machine is connected to the carrier of the first planetary gear mechanism.

2. The apparatus according to claim 1, wherein the speed-reduction mechanism comprises a clutch adapted to connect/disconnect the input shaft and the carrier of the first planetary gear mechanism in response to a running condition of the vehicle.

3. The apparatus according to claim 2, further comprising:
    a brake adapted to fasten the carrier of the first planetary gear mechanism to an apparatus housing.

4. The apparatus according to claim 1, further comprising:
a second electric rotating machine connected to the output shaft.

5. The apparatus according to claim 2, further comprising:
a second electric rotating machine connected to the output shaft.

6. The apparatus according to claim 3, further comprising:
a second electric rotating machine connected to the output shaft.

7. The apparatus according to claim 1, further comprising:
a clutch installed at a location between the engine and the input shaft.

8. The apparatus according to claim 2, further comprising:
a clutch installed at a location between the engine and the input shaft.

9. The apparatus according to claim 1, wherein the rotating machine comprises a motor/generator.

10. The apparatus according to claim 4, wherein the second rotating machine comprises a motor/generator.

\* \* \* \* \*